United States Patent
Pickard et al.

(10) Patent No.: US 9,534,765 B2
(45) Date of Patent: Jan. 3, 2017

(54) LIGHT FIXTURE WITH COEXTRUDED COMPONENTS

(75) Inventors: Paul Kenneth Pickard, Morrisville, NC (US); Dong Lu, Cary, NC (US); James Michael Lay, Cary, NC (US); Joe Janisch, Cary, NC (US)

(73) Assignee: Cree, Inc., Durham, NC (US)

( * ) Notice: Subject to any disclaimer, the term of this patent is extended or adjusted under 35 U.S.C. 154(b) by 29 days.

(21) Appl. No.: 13/338,437

(22) Filed: Dec. 28, 2011

(65) Prior Publication Data

US 2013/0021777 A1    Jan. 24, 2013

Related U.S. Application Data

(60) Provisional application No. 61/511,067, filed on Jul. 24, 2011.

(51) Int. Cl.
*F21S 4/00* (2016.01)
*F21V 21/00* (2006.01)
(Continued)

(52) U.S. Cl.
CPC .............. *F21V 13/04* (2013.01); *B29C 47/067* (2013.01); *F21V 7/0016* (2013.01); *B29C 47/003* (2013.01);
(Continued)

(58) Field of Classification Search
CPC ...... F21V 15/013; F21V 7/0008; F21V 13/04; F21V 7/0016; F21V 29/89; F21V 29/87; F21V 29/777; F21V 29/745; F21V 29/75; F21V 3/0409; F21V 7/22; F21V 21/00; B29C 47/067; Y10T 29/49002; F21Y 2113/005; F21S 2/00; F21S 8/06
(Continued)

(56) References Cited

U.S. PATENT DOCUMENTS 4,573,111 A  *  2/1986  Herst et al. ............... 362/337
4,690,862 A       9/1987  Hoffmann
(Continued)

FOREIGN PATENT DOCUMENTS

EP    2216859 A1    8/2010
GB    2468036 A     8/2010
(Continued)

OTHER PUBLICATIONS

Snell, et al., U.S. Appl. No. 13/189,535, filed Jul. 24, 2011.
(Continued)

*Primary Examiner* — Peggy Neils
*Assistant Examiner* — Alexander Garlen
(74) *Attorney, Agent, or Firm* — Steven B. Phillips; Moore & Van Allen PLLC

(57) ABSTRACT

A light fixture with coextruded components is disclosed. Embodiments of the present invention provide a solid-state light fixture suitable for use in commercial environments. A light fixture according to example embodiments of the invention includes an LED light source and a coextruded optical assembly. In some embodiments, the reflector portion of the assembly includes a thin skin of reflective material. In some embodiments, the assembly includes an interlocking mechanical interface between the reflector and lens portions of the assembly. In some embodiments, the lens portion of the assembly includes two lens plates. In some embodiments, a longer fixture can be assembled by using two, coextruded portions of an optical assembly, where these portions are adapted to be joined end-to-end. Reinforcing members can be used in the reflector and lens assembly.

17 Claims, 10 Drawing Sheets

(51) Int. Cl.

| | | |
|---|---|---|
| *F21V 13/04* | (2006.01) | |
| *B29C 47/06* | (2006.01) | |
| *F21V 7/00* | (2006.01) | |
| B29C 47/00 | (2006.01) | |
| F21S 2/00 | (2016.01) | |
| F21S 8/06 | (2006.01) | |
| F21V 3/04 | (2006.01) | |
| F21V 7/22 | (2006.01) | |
| F21V 21/005 | (2006.01) | |
| F21V 29/74 | (2015.01) | |
| F21V 29/75 | (2015.01) | |
| F21V 29/77 | (2015.01) | |
| F21V 29/87 | (2015.01) | |
| F21V 29/89 | (2015.01) | |
| F21Y 101/00 | (2016.01) | |

(52) U.S. Cl.
CPC ... *F21S 2/00* (2013.01); *F21S 8/06* (2013.01); *F21V 3/0409* (2013.01); *F21V 7/005* (2013.01); *F21V 7/22* (2013.01); *F21V 21/005* (2013.01); *F21V 29/745* (2015.01); *F21V 29/75* (2015.01); *F21V 29/777* (2015.01); *F21V 29/87* (2015.01); *F21V 29/89* (2015.01); *F21Y 2101/00* (2013.01); *F21Y 2103/10* (2016.08); *F21Y 2113/13* (2016.08); *F21Y 2115/10* (2016.08); *Y10T 29/49002* (2015.01)

(58) Field of Classification Search
USPC .............. 264/500–510; 250/505.1; 362/222, 362/217.01, 217.02, 217.13–217.15, 217.17
See application file for complete search history.

(56) References Cited

U.S. PATENT DOCUMENTS

| | | | |
|---|---|---|---|
| 5,428,912 A * | 7/1995 | Grondal et al. ................ 40/570 |
| 5,688,042 A | 11/1997 | Madadi et al. | |
| 6,056,416 A * | 5/2000 | Ngai et al. .................... 362/225 |
| 6,554,446 B1 | 4/2003 | Walsh et al. | |
| 6,592,240 B2 * | 7/2003 | Camarota et al. ............ 362/399 |
| 6,641,290 B2 * | 11/2003 | Ishiharada .................... 362/495 |
| 6,853,151 B2 | 2/2005 | Leong et al. | |
| 6,860,628 B2 | 3/2005 | Robertson et al. | |
| 6,874,924 B1 | 4/2005 | Hulse et al. | |
| 6,936,968 B2 | 8/2005 | Cross et al. | |
| 7,048,410 B2 | 5/2006 | Kutler | |
| 7,049,761 B2 | 5/2006 | Timmermans et al. | |
| 7,114,830 B2 | 10/2006 | Robertson et al. | |
| 7,131,760 B2 * | 11/2006 | Mayer et al. ................. 362/555 |
| 7,213,940 B1 | 5/2007 | Van De Ven et al. | |
| 7,307,391 B2 | 12/2007 | Shan | |
| 7,510,299 B2 | 3/2009 | Timmermans et al. | |
| 7,654,702 B1 * | 2/2010 | Ding ..................... F21V 29/004 362/218 |
| 7,703,945 B2 * | 4/2010 | Leung et al. .................. 362/246 |
| 7,712,918 B2 * | 5/2010 | Siemiet et al. ............... 362/241 |
| 7,815,338 B2 | 10/2010 | Siemiet et al. | |
| 7,926,975 B2 | 4/2011 | Siemiet et al. | |
| 7,976,196 B2 | 7/2011 | Ivey et al. | |
| 8,058,659 B2 | 11/2011 | Bisberg | |
| 8,093,823 B1 | 1/2012 | Ivey et al. | |
| 8,115,411 B2 | 2/2012 | Shan | |
| 8,118,447 B2 | 2/2012 | Simon et al. | |
| 8,247,985 B2 | 8/2012 | Timmermans et al. | |
| 8,282,247 B2 | 10/2012 | Ivey et al. | |
| 8,324,817 B2 | 12/2012 | Ivey et al. | |
| 8,360,599 B2 | 1/2013 | Ivey et al. | |
| 8,362,710 B2 | 1/2013 | Langovsky | |
| 8,382,327 B2 | 2/2013 | Timmermans et al. | |
| 8,419,223 B2 | 4/2013 | Withers | |
| 8,421,366 B2 | 4/2013 | Palazzolo et al. | |
| 8,445,824 B2 * | 5/2013 | Negley et al. ............. 250/201.1 |
| 8,449,137 B2 | 5/2013 | Dassanayake et al. | |
| 8,482,212 B1 | 7/2013 | Ivey et al. | |
| 8,573,813 B2 | 11/2013 | Ivey et al. | |
| 8,596,813 B2 | 12/2013 | Ivey | |
| 2002/0060526 A1 | 5/2002 | Timmermans et al. | |
| 2003/0223233 A1 | 12/2003 | Calzaretta et al. | |
| 2004/0001344 A1 * | 1/2004 | Hecht .......................... 362/555 |
| 2004/0042225 A1 | 3/2004 | Dealey et al. | |
| 2005/0275131 A1 | 12/2005 | Hoium et al. | |
| 2007/0217189 A1 * | 9/2007 | Graham ....................... 362/217 |
| 2008/0042147 A1 | 2/2008 | Swantner et al. | |
| 2009/0251892 A1 | 10/2009 | Hatti et al. | |
| 2011/0164417 A1 | 7/2011 | Huang | |
| 2012/0051041 A1 * | 3/2012 | Edmond et al. ............. 362/231 |

FOREIGN PATENT DOCUMENTS

| | | |
|---|---|---|
| JP | H08162677 A | 6/1996 |
| WO | 2008100894 A1 | 8/2008 |
| WO | 2010099755 A1 | 9/2010 |
| WO | 2011072308 A1 | 6/2011 |

OTHER PUBLICATIONS

Cree, Inc., International Application No. PCT/US2012/046388, International Search Report and Written Opinion, Oct. 5, 2012.
U.S. Appl. No. 29/467,949, filed Sep. 25, 2013.
U.S. Appl. No. 13/943,152, filed Jul. 16, 2013.
EXXONMOBIL Chemical, Santoprene Brand TPVs, Design Guidelines for Thermoplastic Vulcanizates (TPVs), 2006, pp. 1-35.
European Patent Office; European Office Action for Application No. 12748288.3 dated Feb. 20, 2015.

* cited by examiner

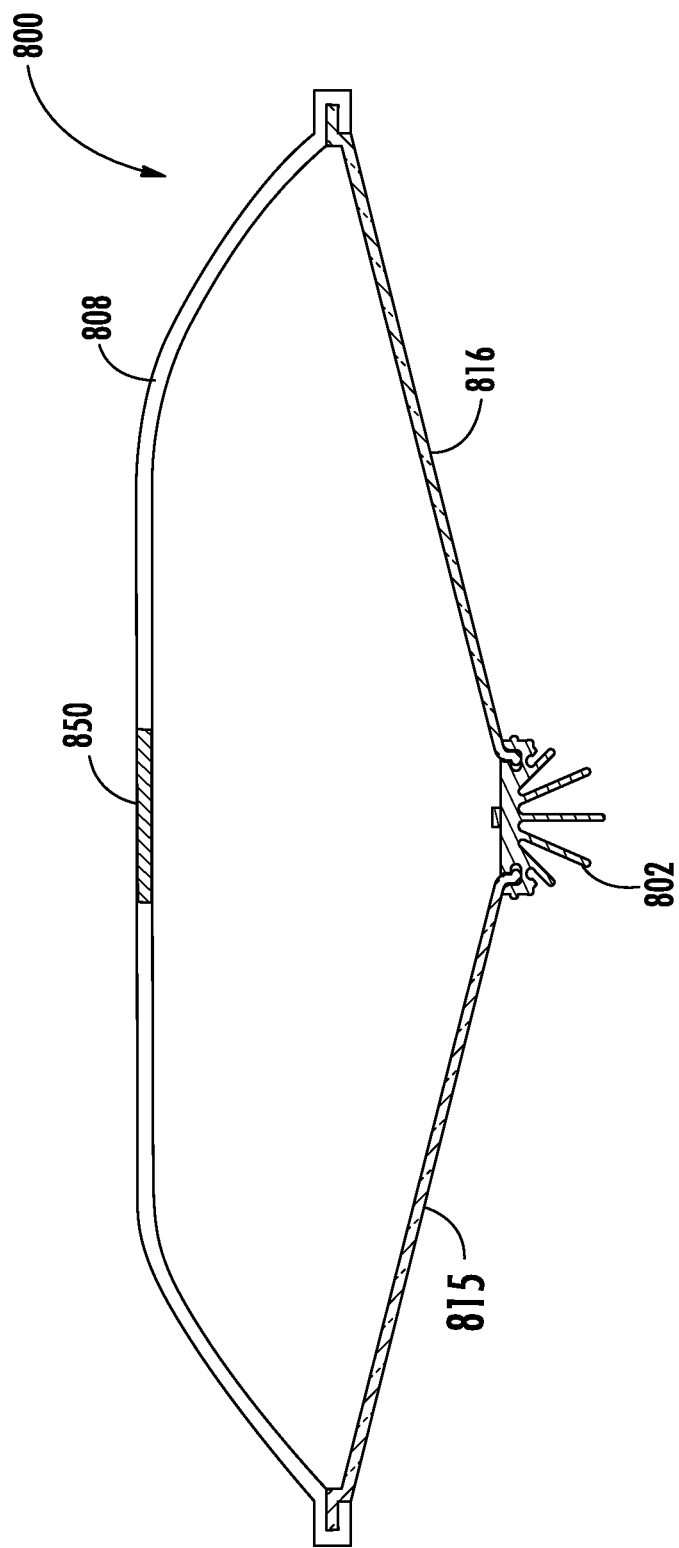

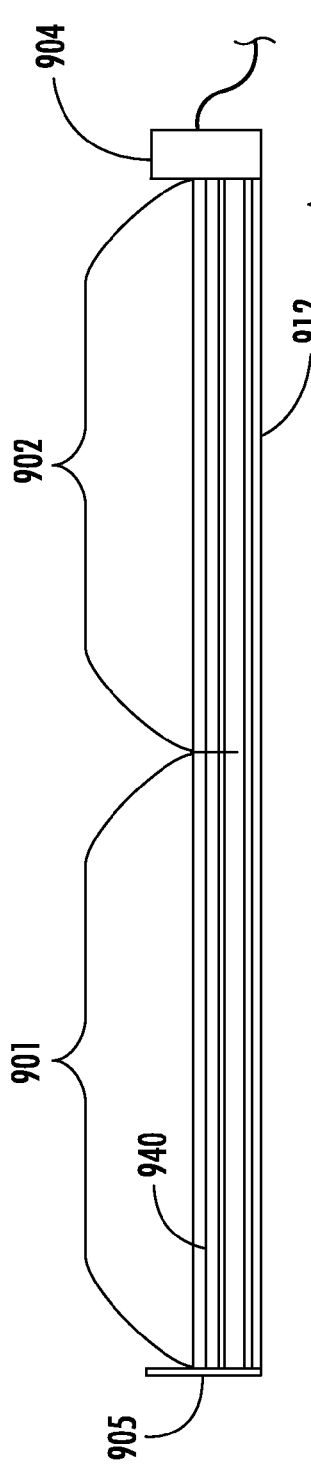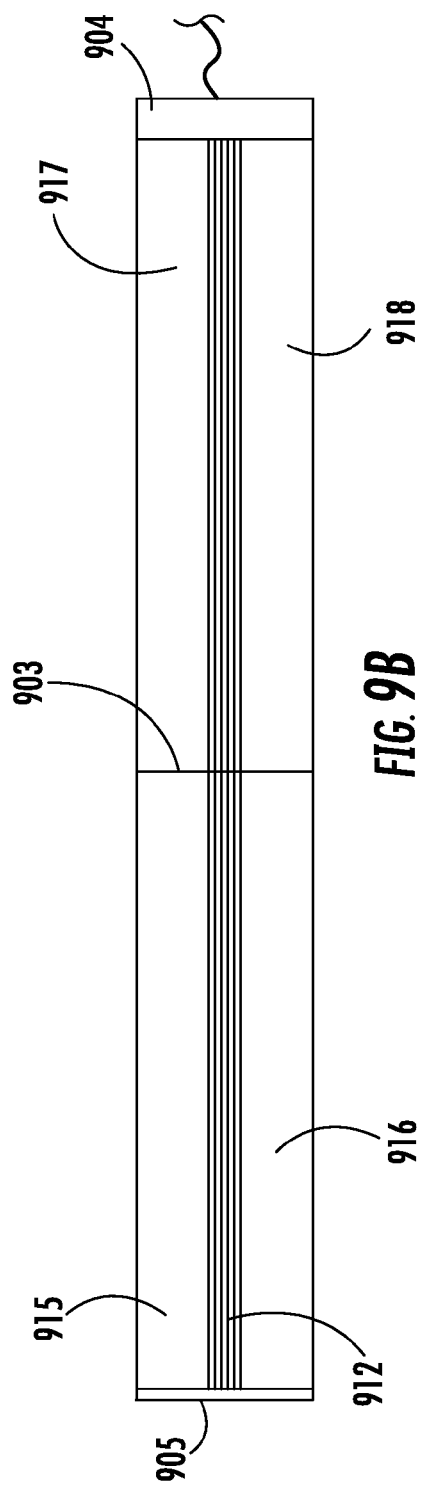

LIGHT FIXTURE WITH COEXTRUDED COMPONENTS

CROSS-REFERENCE TO RELATED APPLICATION

This application claims priority from, commonly assigned provisional patent application Ser. No. 61/511,067, filed Jul. 24, 2011, the entire disclosure of which is hereby incorporated herein by reference.

BACKGROUND

Light emitting diode (LED) lighting systems are becoming more prevalent as replacements for existing lighting systems. LEDs are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. In many applications, one or more LED dies (or chips) are mounted within an LED package or on an LED module, which may make up part of a lighting unit, lamp, "light fixture" or more simply a "fixture," which includes one or more power supplies to power the LEDs. An LED fixture may be made with a form factor that allows it to replace a standard fixture or bulb. LEDs can also be used in place of florescent lights as backlights for displays.

For most LED lamps, LEDs may be selected to provide various light colors to combine to produce light output with a high color rendering index (CRI). The desired color mixing may be achieved, for example, using blue, green, amber, red and/or red-orange LED chips. One or more of the chips may be in a package with a phosphor or may otherwise have a locally applied phosphor. Translucent or transparent materials may be used with LED lighting fixtures to provide diffusion, color mixing, to otherwise direct the light, or to serve as an enclosure to protect the LEDs.

Rigid or semi-rigid materials may be included in a fixture or lamp as optical elements external to the LED modules themselves. Such optical elements may allow for localized mixing of colors, collimate light, and provide the minimum beam angle possible. Such optical elements may include reflectors, lenses, and/or lens plates. Reflectors can be, for example, of the metallic, mirrored type, in which light reflects of opaque silvered surfaces, or be made of or use white or near-white highly reflective material. Reflectors can also made of or include a substrate made of plastic or metal coated with a more reflective material. Lenses can vary in complexity and level of optical effect, and can be or include traditional lenses, total internal reflection optics, or glass or plastic plates with or without coatings or additives.

SUMMARY

Embodiments of the present invention can provide a low-cost, solid-state light fixture suitable for use in retail or other commercial environments. Embodiments of the invention can take the form of a linear light fixture of conventional length, or of longer lengths, such as eight feet. Such large, solid-state linear light fixtures can provide an excellent foundation for a retail store general illumination. In at least some embodiments, cost can be reduced and manufacturing efficiency can be increased by coextruding an optical assembly. For example the reflector, or a portion of the reflector for a longer fixture, can be extruded as a single-piece thermoplastic component with other parts, for example a diffuser lens or lenses.

Example embodiments of the present invention include a light fixture with an LED light source and a coextruded optical assembly. In some embodiments, the reflector portion of the optical assembly includes a thin skin of reflective white material on a substrate. In some embodiments, the assembly includes an interlocking mechanical interface between a reflector and lens portions of the assembly. In some embodiments, the lens or lens portion of the assembly includes two lens plates. In some embodiments, the reflector portion or upper portion of the fixture includes sections of reflective material and sections of diffusively transparent material.

In some embodiments, a longer fixture can be assembled by using two, complimentary, coextruded portions of an optical assembly, where these portions are adapted to be joined end-to-end. In some such embodiments, reinforcing members can be used in at least the reflector portion of the assembly.

In some embodiments of the invention, the LED light source includes an LED array with at least two groups of LEDs, wherein one group, if illuminated, would emit light having dominant wavelength from 440 to 480 nm, and another group, if illuminated, would emit light having a dominant wavelength from 605 to 630 nm. In some embodiments LEDs in one group are packaged with a phosphor, which, when excited, emits light having a dominant wavelength from 560 to 580 nm.

In some embodiments one group of LEDs, if illuminated, would emit light having dominant wavelength from 435 to 490 nm, and another group, if illuminated, would emit light having a dominant wavelength from 600 to 640 nm. In some embodiments LEDs in one group are packaged with a phosphor, which, when excited, emits light having a dominant wavelength from 540 to 585 nm.

A light fixture according to at least some embodiments of the invention can be made by coextruding components to produce the optical assembly. A plurality of LED devices can be fixed or mounted on a heatsink. These LED devices can be mounted directly or on an intervening a printed circuit board. The plurality of LED devices can then serve as a light source for the light fixture. The heatsink can then be positioned so that a portion of the light from the light source is emitted from the LEDs, reflected from the reflector and thus directed through a lens or lens plates. In some embodiments, the heat sink can be positioned between two lens plates that serve as the lens or lens portion of the optical assembly of the fixture.

BRIEF DESCRIPTION OF THE DRAWINGS

FIG. 8 is a cross-sectional view of a further example coextruded optical assembly that is again illustrated together with a heatsink.

FIGS. 9A and 9B are a cross-sectional side view and a bottom view, respectively, of suspended, linear light fixture according to example embodiments of the present invention.

DETAILED DESCRIPTION

Figure 1:
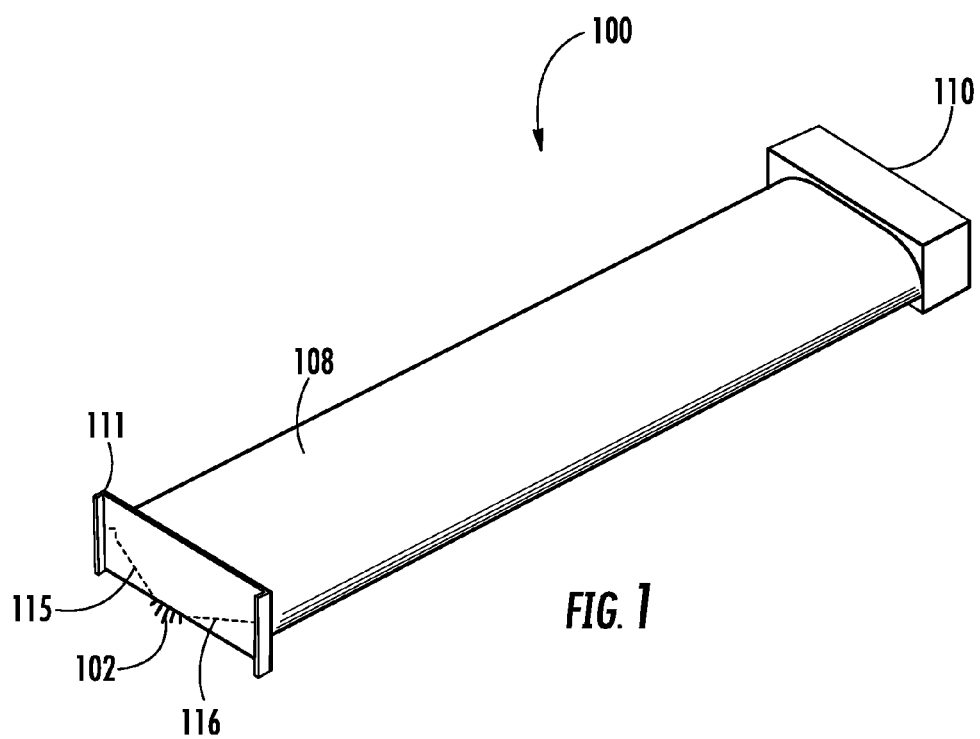
FIG. 1 is a top perspective view of a linear lighting system or linear light fixture according to at least some embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

Figure 2:
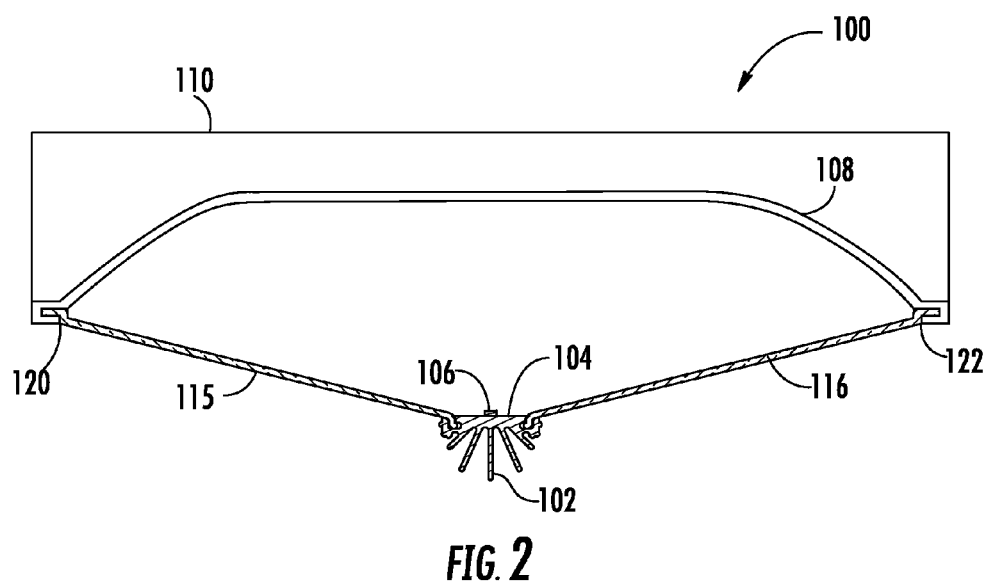
FIG. 2 is a cross-sectional view of the lighting system of FIG. 1.

FIG. 1 is a top perspective view of a light fixture 100, and FIG. 2 is a cross-sectional view of light fixture 100 according to example embodiments of the invention. Light fixture 100 is a linear fixture, which can be, as an example, a suspended linear light fixture. Light fixture 100 includes heatsink 102 having a mounting surface 104 on which LED packages or devices 106 can be mounted or fixed to collectively serve as a light source. Light fixture 100 also includes reflector 108 and end caps 110 and 111. End cap 110 is larger than end cap 111 and is shaped to act as a circuit box to house electronics used to drive and control the light source such as rectifiers, regulators, timing circuitry, and other components. The fixture illustrated in FIGS. 1 and 2 is designed to be suspended from a ceiling with chains or stanchions (not shown) but a similar troffer style fixture can also be designed to be installed in ceiling with appropriate materials.

In the example of FIGS. 1 and 2, reflector 108 includes a flat region opposite the mounting surface of the heatsink; however, a reflector for a light engine according to embodiments of the invention can take various shapes. For example, reflector 108 could be parabolic in shape, or include two or more parabolic regions. Light fixture 100 also includes a diffuser lens assembly made up of two lens plates, 115 and 116, disposed at the sides of the heatsink. In the perspective view of FIG. 1 the outline of these lens plates is shown in dotted lines since the plates are not normally visible from this angle. The reflector and lens plates are joined at points 120 and 122 of FIG. 2 and assembled by coextrusion in a manner to be described later in this disclosure. In some embodiments, an interlocking mechanical interface at points 120 and 122 enables the reflector and lens or lenses to be handled as a singular coextruded optical assembly.

Figure 3:
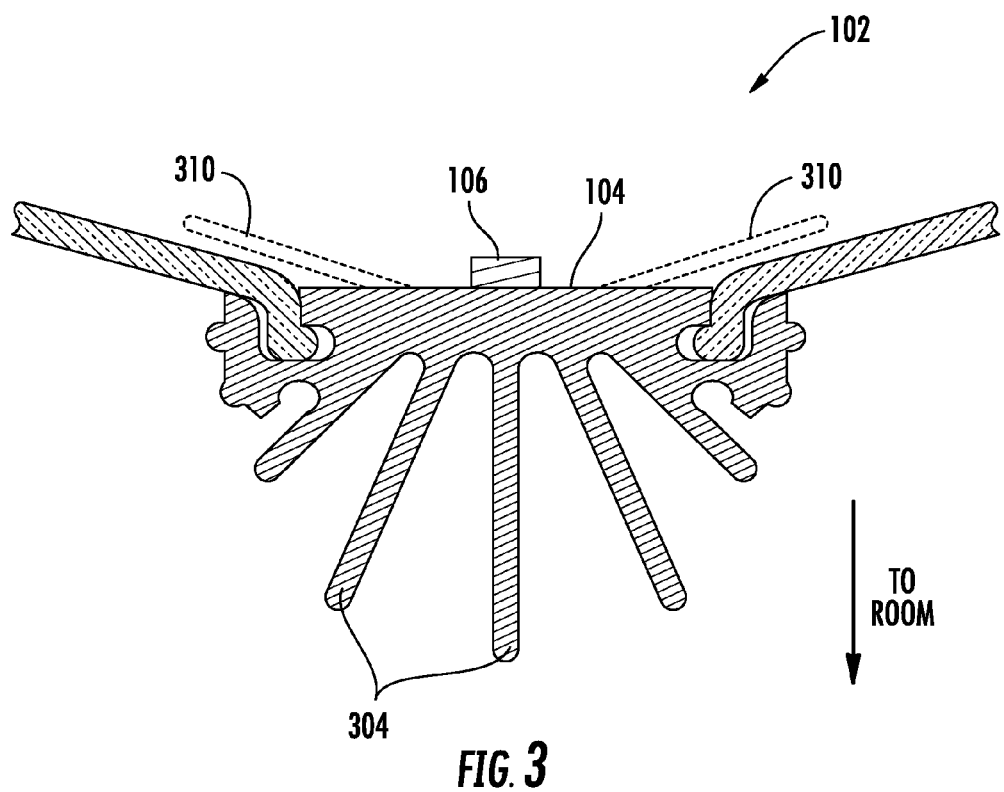
FIG. 3 is a cross-sectional view of the heatsink and light source for the light engine of FIG. 1.

FIG. 3 is a close-up, cross-sectional view of the heatsink area of example light fixture 100 of FIG. 2, in which heatsink 102 and the light source are visible in some detail. It should be understood that FIG. 3 provides an example only as many different heatsink structures could be used with an embodiment of the present invention. The orientation of the heatsink relative to a room being illuminated is indicated. The topside portion of heatsink 102 faces the interior cavity of the light engine. Heatsink 102 includes fin structures 304 and mounting surface 104. The mounting surface 104 provides a substantially flat area on which LED devices 106 can be mounted for use as a light source. These LEDs can be mounted directly on the heatsink, depending on the material and provisions for wiring the LEDs. Alternatively, a metal core printed circuit board (PCB) can be mounted on the heatsink and the LEDs mounted on the PCB.

The LED devices 106 of FIG. 2 can be mounted to face orthogonally to the mounting surface 104 to face the center region of the reflector, or they may be angled to face other portions of the reflector. In some embodiments, an optional baffle 310 (shown in dotted lines) may be included. The baffle 310 reduces the amount of light emitted from the LED light source at high angles that may escape the cavity of the light fixture without being reflected. Such baffling can help prevent hot spots or color spots visible when viewing the fixture at high viewing angles.

Figure 4:
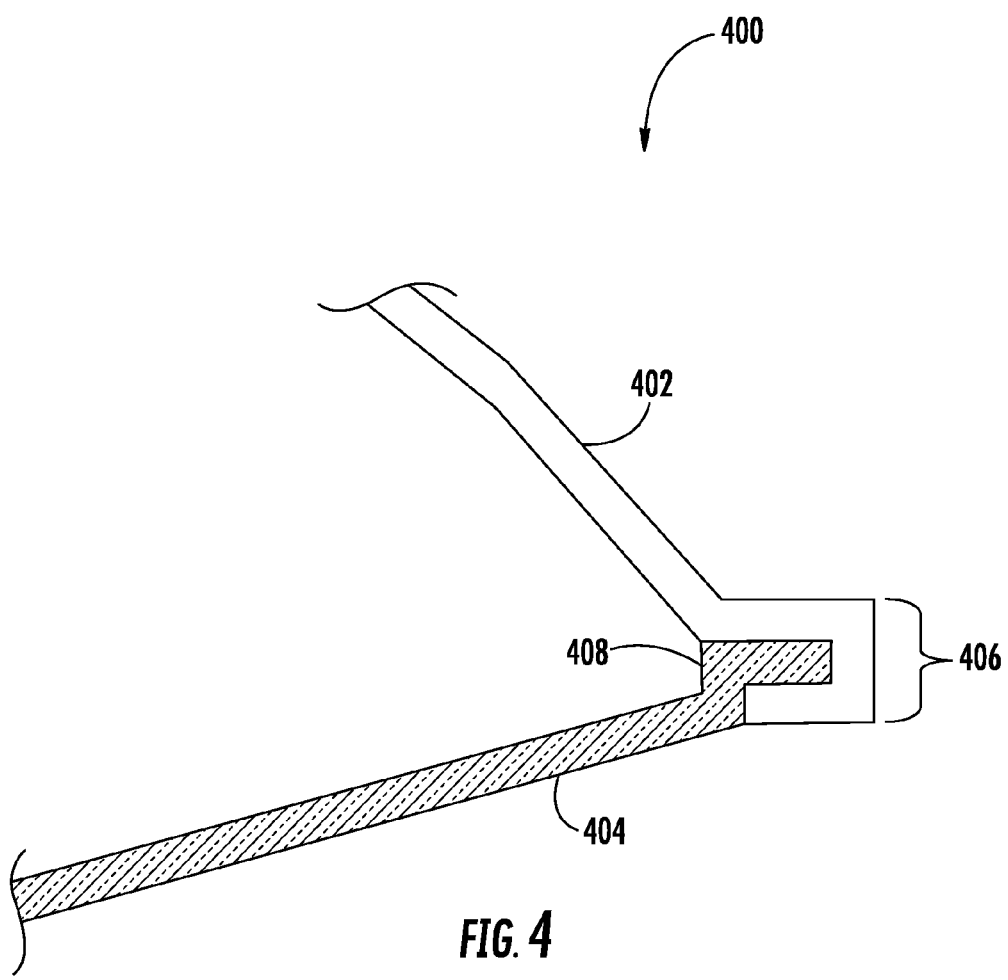
FIG. 4 is an enlarged view of a portion of an optical assembly, more specifically a coextruded lens and reflector assembly for the lighting system of FIG. 1.

FIG. 4 illustrates one example of a coextruded optical assembly 400 that can be used with example embodiments of the invention. A close up, cross-section of only the portion of the assembly at point 122 of FIG. 2 is shown. The other side of the assembly at point 120 of FIG. 2 is similar but reversed left-to-right. Reflector 402 is formed from highly reflective white plastic, and lens plate 404 is formed from transparent or translucent plastic. Reflector 402 and lens plate 404 are coextruded with a form that creates the interlocking mechanical interface shown. Depending on the materials chosen, a chemical bond may also result from the extrusion. In the example of FIG. 4, a u-shaped portion 406 of reflector 402 grips an offset and protruding portion 408 of lens plate 404.

Figure 5:
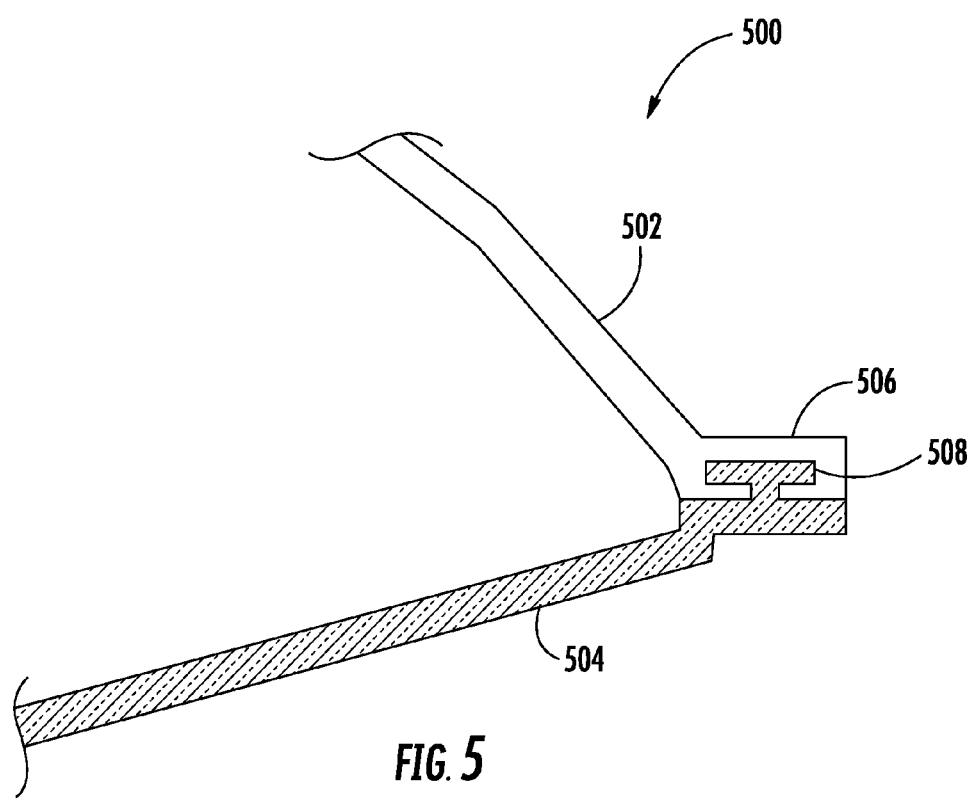
FIG. 5 is an enlarged view of a portion of another coextruded lens and reflector assembly for use with example embodiments of the invention.

FIG. 5 illustrates another example of a coextruded optical assembly 500 that can be used with example embodiments of the invention. Again, a close up, cross-section of only the portion of the assembly that would be around point 122 of FIG. 2 is shown. The other side of the assembly that would be around point 120 of FIG. 2 is similar but reversed left-to-right. Reflector 502 is formed from highly reflective white plastic, and lens plate 504 is formed from transparent or translucent plastic. Again, reflector 502 and lens plate 504 are coextruded with a form that creates the interlocking mechanical interface shown. Depending on the materials chosen, a chemical bond may also result from the extrusion. In the example of FIG. 5, an upside-down, u-shaped portion 506 of reflector 502 grips a protruding portion 508 of lens plate 504. It should be noted that the shapes of the interlocking portions of the reflector and lens plates illustrated herein are examples only. The interlocking and/or chemically bonding parts of the optical assembly can take any of an infinite variety of shapes and sizes. As just a few examples, in addition to the u-shaped and protruding portions shown above, tabs, posts, slots, edges and/or ridges could be used.

Figure 6:
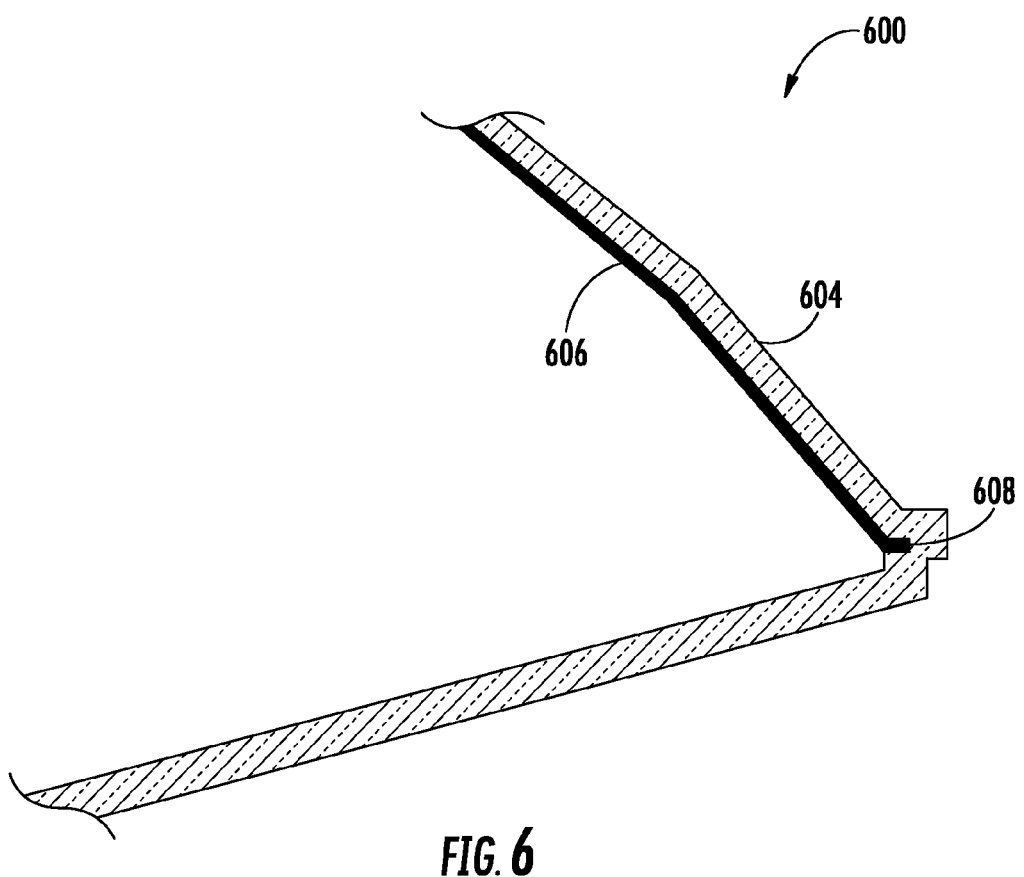
FIG. 6 is an enlarged view of a portion of another example coextruded lens and reflector assembly for use with example embodiments of the invention.

FIG. 6 illustrates another example of a coextruded optical assembly 600 that can be used with example embodiments of the invention. A close up, cross-section of only the portion of the assembly that would be around point 122 of FIG. 2 is shown. The other side of the assembly that would be around point 120 of FIG. 2 is similar but reversed left-to-right. In this case, the bulk of the assembly is made up of a transparent or translucent substrate 604. Reflector 606 is a thin skin of reflective material. In some embodiments, the material of reflector 606 is about 10% transmissive. In some embodiments, the material is about 5% or about 25% transmissive, or between about 5% and 25% transmissive. Again, the entire assembly can be coextruded with a form that creates complimentary mechanical and/or chemical interfaces between the two materials. In the example of FIG. 6, the reflective material also extends into a slot 608 in the translucent substrate material.

Figure 7:
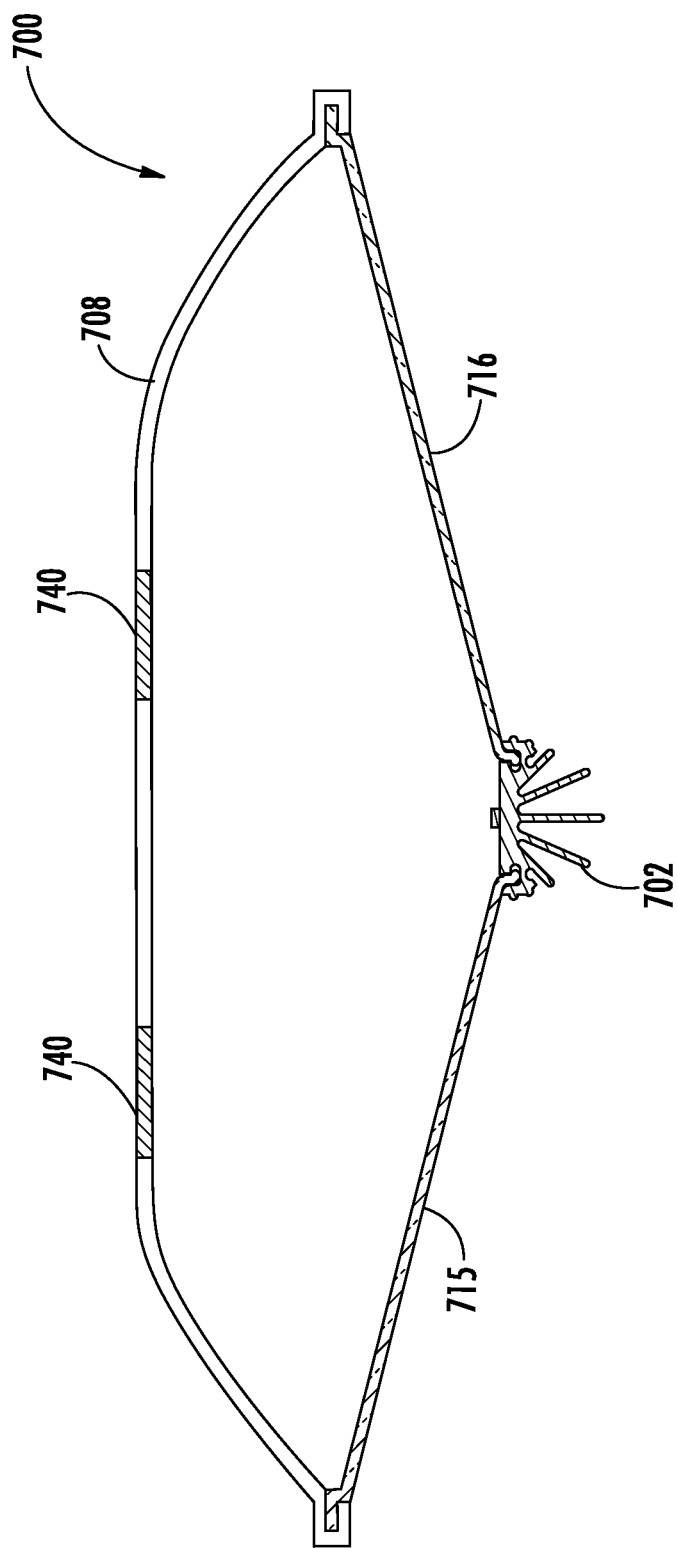
FIG. 7 is a cross-sectional view of another example coextruded optical assembly for use with example embodiments of the invention. The optical assembly in this view is illustrated with a heatsink.

FIG. 7 is a cross-sectional view of a coextruded optical assembly as well as a heat sink 702 (together, light engine 700) from a linear fixture according to another embodiment of the invention. In this case reflector 708 is sectioned, and in between reflector sections are disposed sections 740 of diffusively transparent lens material to allow some light to pass through the top of the fixture and provide upward lighting. The two materials of the sectioned reflector can be interconnected by a mechanical interlock or chemical bond as previously described. Sections 740 of diffusively transparent lens material can also be referred to as lens plates. Lens plates 715 and 716 are optional in this embodiment. If lens plates 715 and 716 are not included, the upper reflector and lens assembly as well as the heat sink are supported by the end caps of the fixture. The optical assembly in the embodiment of FIG. 7 is again coextruded, whether the fixture includes only the top, sectioned reflector and lens arrangement or both that reflector and lens arrangement as well as lens plates 715 and 716.

FIG. 8 is a cross-sectional view of a reflector and lens assembly as well as a heat sink 802 (together, light engine 800) from a linear fixture according to another embodiment of the invention. Again, reflector 808 is sectioned, and in between reflector sections is disposed a section 850 of diffusively transparent lens material to allow some light to pass through the top of the fixture and provide upward lighting. The two materials of the sectioned reflector can be interconnected by a mechanical interlock or chemical bond as previously described. Section 850 of diffusively transparent lens material can also be referred to as a lens plate. Lens plates 815 and 816 are again optional in this embodiment. If lens plates 815 and 816 are not included, the remaining, upper reflector and lens assembly as well as the heat sink are supported by the end caps of the fixture. The reflector and lens assembly in the embodiment of FIG. 8 is again coextruded, either with or without lens plates 815 and 816.

Embodiments of the invention can make use of a thermoplastic material for the reflective plastic to be coextruded with the lens or lens plate of a fixture. Examples of highly reflective white material that can be used include Makrolon™ 6265X or BFL2000LEBFL400011 from Bayer AG. In some embodiments, a material with a surface reflectivity is at least 90% can be used. In other embodiments, the reflectivity of the material can be at least 94%, at least 95% or at least 97%. Note that if the invention is used in an in-ceiling troffer style fixture, plenum rated material may be required for the reflector.

FIG. 9A is a cutaway side view of a linear light fixture 900, and FIG. 9B is a bottom view of light fixture 900. In the example embodiment of FIGS. 9A and 9B, a longer light fixture is made by interconnecting complimentary elongated portions 901 and 902 of a reflector and lens assembly, which are adapted to be joined end-to-end at seam 903. End caps 904 and 905 provide support for the fixture. End cap 904 is larger than end cap 905 and is shaped to act as a circuit box to house electronics used to drive and control the light sources such as rectifiers, regulators, timing circuitry, and other components. Wiring from the end cap/circuit box to the light sources can be passed through holes or slots in heat sink 912, or the LEDs can receive power through a metal core PCB mounted on the surface of the heatsink. If a PCB is used, a wiring harness from the end cap/circuit box can be connected to the PCB. The reflector portions are occluded from view by the lens plates 915, 916, 917 and 918 and heatsink 912. The bottom side of heatsink 912 exposed to the room environment.

Still referring to FIGS. 9A and 9B, depending on the materials, other supporting structures, and length of the fixture, a reinforcing member or members 940 can also be included in the fixture. For example, ribs or ridges can be included by extrusion into the profile of the reflector, or steel or aluminum rods or posts can be used as reinforcing members by extruding or otherwise forming snap-in or slide-in holders in the reflector. It should be noted that although the light fixture of FIGS. 9A and 9B can be assembled from a reflector and lens assembly with elongated portions, and a single heatsink, the same style and size of fixture can also be assembled where all the parts include multiple portions. For example, the heatsink could be made of elongated portions, which are adapted to be joined end-to-end. More than two elongated portions of the reflector and lens assembly or any other parts of the fixture can also be used.

Figure 10A:
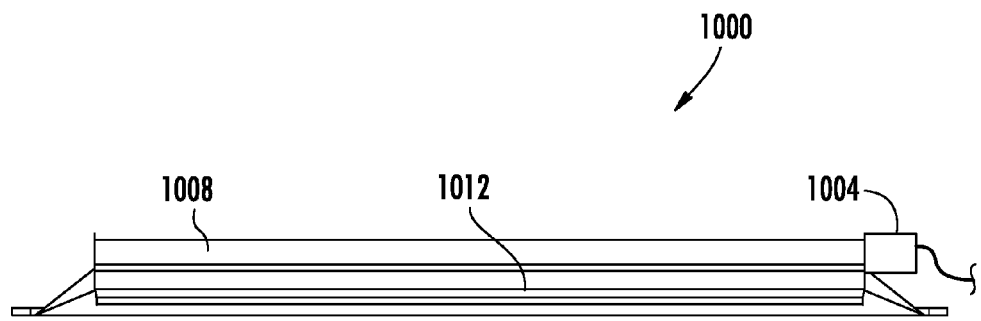
FIGS. 10A and 10B are a cross-sectional side view and a bottom view, respectively, of another light fixture according to example embodiments of the present invention. In this example, the light fixture includes a pan.
Figure 10B:
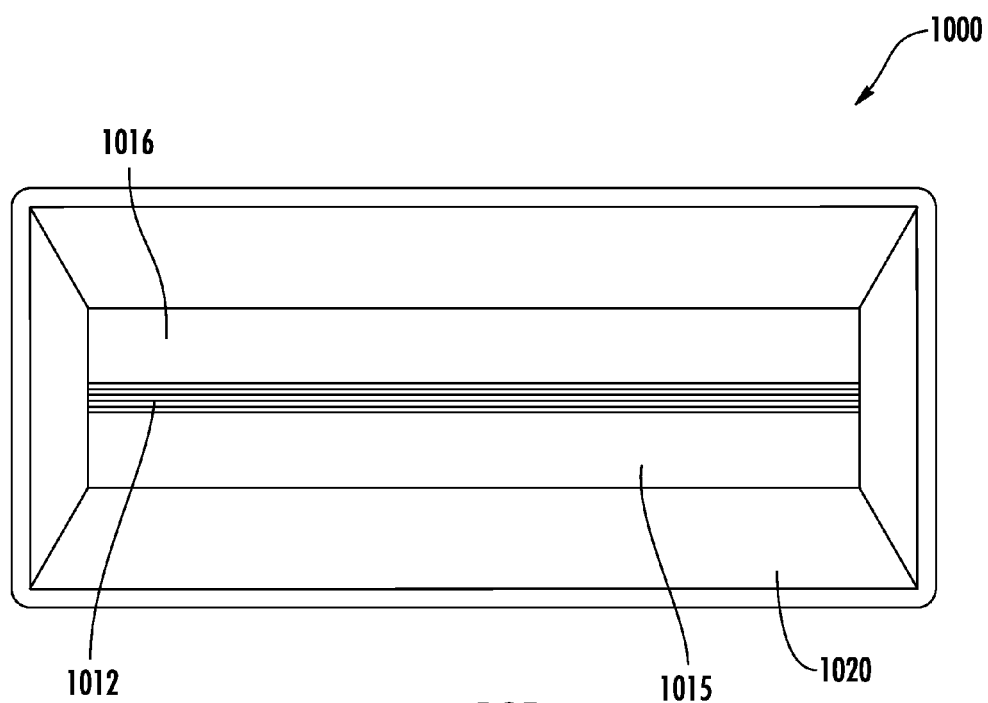

FIG. 10A is a cutaway side view of a light fixture 1000, and FIG. 10B is a bottom view of light fixture 1000. Circuit box 1004 is attached to the backside of the light fixture. Circuit box 1004 again houses electronics used to drive and control the light sources such as rectifiers, regulators, timing circuitry, and other components. Circuit box 1004 is attached to one end of reflector 1008. Wiring from the circuit box to the light sources can be passed through holes or slots in heat sink 1012, or the LEDs can receive power through a metal core PCB mounted on the surface of the heatsink. If a PCB is used, a wiring harness from the end cap/circuit box can be connected to the PCB. In FIG. 10B, the reflector 1008 is occluded from view by the lens plates 1015 and 1016 and the heatsink 1012. The bottom side of the heatsink 1012 is exposed to the room environment. Pan 1020 is sized to fit around the light engine and enable the fixture to be installed in a ceiling, or simply to have a larger profile.

A light fixture according FIGS. 9A and 9B or according to FIGS. 10A and 10B can be assembled by coextruding a reflector and a lens, or portions thereof, to produce the coextruded optical assembly. A plurality of LED devices can be fixed or mounted on a heatsink either directly or with an intervening PCB. The plurality of LED devices can then serve as a light source for the light fixture. The heatsink can then be positioned so that a portion of the light from the light source is emitted from the LEDs, reflected from the reflector and thus directed through the lens or lens plates. In embodiments where at least two lens plates are used, the heatsink can be positioned between lens plates. In an embodiment where portions of a reflector and lens assembly are joined end-to-end, it might be said that four lens plates are used, although one could still consider such an embodiment as having two lens plates where each includes two portions. Various other designs using other numbers of lens plates or reflector portions can be devised as an embodiment of the present invention. Additional numbers of lens plates can also be used in the sense that the lens sections in the top of the light engines shown in FIGS. 7 and 8 can also be referred to as lens plates. All of the lens material in a fixture may be collectively referred to as a lens or a lens arrangement.

A multi-chip LED package used with an embodiment of the invention and can include light emitting diode chips that emit hues of light that, when mixed, are perceived in combination as white light. Phosphors can also be used. Blue or violet LEDs can be used in the LED devices and the appropriate phosphor can be deployed on a carrier within the fixture. The back reflector of the fixture could also be coated with a phosphor to provide remote wavelength conversion. LED devices can be used with phosphorized coatings packaged locally with the LEDs to create various colors of light. For example, blue-shifted yellow (BSY) LED devices can be used with a red phosphor on or in a carrier or on the reflector to create substantially white light, or combined with red emitting LED devices on the heatsink to create substantially white light. Such embodiments can produce light with a CRI of at least 70, at least 80, at least 90, or at least 95. By use of the term substantially white light, one could be referring to a chromacity diagram including a blackbody locus of points, where the point for the source falls within four, six or ten MacAdam ellipses of any point in the blackbody locus of points.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. Each of the former, blue LEDs are packaged with a phosphor that, when excited, emits light having a dominant wavelength from 560 to 580 nm, so as to form a blue-shifted-yellow LED device. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

The various parts of an LED fixture according to example embodiments of the invention can be made of any of various materials. Heatsinks can be made of metal or plastic, as can the various portions of the housings for the components of a fixture. A fixture according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A linear fixture comprising:
    a heatsink;
    a plurality of LED devices mounted to face orthogonally to a mounting surface of the heatsink to direct light toward an interior cavity of the linear fixture and thereby serve as a light source for the linear fixture; and
    a singular coextruded optical assembly comprising a single plastic reflector that is generally concave relative to the LED devices, includes a flat central region, an interior surface of which is substantially parallel to and opposite the mounting surface, and is bonded to each of at least two, generally flat plastic lens plates by an interlocking mechanical interface, the lens plates also being disposed at the sides of the mounting surface so that the LED devices face the generally concave plastic reflector.

2. The linear fixture of claim 1 wherein the plastic reflector comprises a thin skin of reflective material on a substrate.

3. The linear fixture of claim 2 wherein the plurality of LED devices further comprises at least two groups of LEDs, wherein a first group, if illuminated, would emit light having a dominant wavelength from 435 to 490 nm, and a second group, if illuminated, would emit light having a dominant wavelength from 600 to 640 nm, one of the first and second groups being packaged with a phosphor, which, when excited, emits light having a dominant wavelength from 540 to 585 nm.

4. The linear fixture of claim 3 wherein the first group, if illuminated, would emit light having a dominant wavelength from 440 to 480 nm, and the second group, if illuminated, would emit light having a dominant wavelength from 605 to 630 nm, one of the first and second groups being packaged with a lumiphor, which, when excited, emits light having a dominant wavelength from 560 to 580 nm.

5. The linear fixture of claim 1 wherein at least one of the plastic reflector and the plastic lens plates comprises two, complimentary elongated portions adapted to be joined end-to-end.

6. The linear fixture of claim 5 wherein the plastic reflector comprises a thin skin of reflective material on a substrate.

7. The linear fixture of claim 6 further comprising reinforcing members disposed in the plastic reflector.

8. A coextruded optical assembly for a linear fixture, the coextruded optical assembly comprising a single generally concave plastic reflector including a flat central region and generally flat plastic lens plates, the plastic lens plates each bonded to the plastic reflector by an interlocking mechanical interface to enable the plastic reflector and the plastic lens plates to be handled as a singular optical assembly, the generally flat plastic lens plates further being configured to be disposed at the sides of a mounting surface of a heatsink for LEDs mounted orthogonally to the mounting surface, which is further facing and substantially parallel to an interior surface of the flat central region of the generally concave plastic reflector to direct light toward an interior cavity of the linear fixture.

9. The coextruded optical assembly of claim 8 further comprising two, complimentary elongated portions adapted to be joined end-to-end.

10. The coextruded optical assembly of claim 9 further comprising reinforcing members disposed in the plastic reflector.

11. The coextruded optical assembly of claim 8 wherein the plastic reflector further comprises a thin skin of reflective material on a substrate.

12. The coextruded optical assembly of claim 11 further comprising two, complimentary elongated portions adapted to be joined end-to-end.

13. The coextruded optical assembly of claim 12 further comprising reinforcing members disposed in the plastic reflector.

14. A method of assembling a linear fixture, the method comprising:
coextruding an optical assembly comprising a single generally concave plastic reflector including a flat central region and gripping a protruding section of each of at least two generally flat plastic lens plates, the coextruding being accomplished so that a gripping portion of the plastic reflector and the protruding section form an interlocking mechanical interface between each of the at least two generally flat plastic lens plates and the plastic reflector and enable the plastic reflector and the at least two generally flat plastic lens plates to be handled as a singular coextruded optical assembly;
providing a plurality of LED devices to serve as a source of light for the linear fixture; and
positioning the light source on a mounting surface of a heatsink relative to the coextruded optical assembly so that the plastic lens plates are disposed at the sides of the plurality of LED devices, the optical assembly further being arranged so that the light from the plurality of LED devices will be directed to an interior cavity relative to an interior surface of the flat central region of the generally concave plastic reflector that is substantially parallel to the mounting surface and so that at least a portion of the light is reflected from the generally concave plastic reflector.

15. The method of claim 14 wherein the coextruding of the plastic reflector and the plastic lens plates further comprises coextruding the plastic reflector with a thin skin of reflective material on a substrate.

16. The method of claim 15 wherein the coextruded optical assembly comprises two, complimentary elongated portions and further comprising joining the two, complimentary elongated portions end-to-end.

17. The method of claim 16 further comprising including reinforcing members in the plastic reflector.

* * * * *